Patented Nov. 9, 1937

2,098,254

UNITED STATES PATENT OFFICE 2,098,254

METHOD AND MATERIAL FOR RETARDING OXIDATION AND RANCIDITY IN FOOD SUBSTANCES

Henry A. Mattill and Harold S. Olcott, Iowa City, Iowa, assignors to Lever Brothers Company, a corporation of Maine No Drawing. Application August 28, 1936, Serial No. 98,342

13 Claims. (Cl. 99—150)

This invention relates to methods and materials for preserving food substances by retarding oxidation and rancidity therein, as well as to foods and food ingredients and products preserved by such methods.

One object of the invention is to provide a practicable method for preserving food substances by the addition thereto of an effective antioxidant substance of a character capable of being used without harmful adulteration of the food substance to be preserved against injurious oxidation changes.

The new antioxidant substances included in the subject matter of this invention, for convenience, are termed "inhibitols".

A further object is the provision of such a method in which the inhibitol employed is one obtained from or of a character occurring in edible vegetable materials, and having effective antioxygenic properties, so as to be adapted for efficient use for the purpose described, without harmful adulteration of the food substance.

A further object is the provision in a concentrated and purified form of suitable inhibitols obtained from or of the general character found in edible vegetable substances and adapted for use in foods and food ingredients and products to substantially prevent or retard oxidizing influences, without harmful adulteration of the food materials.

An additional object of the invention is the preservation of food substances by the addition thereto of both an inhibitol and other antioxygenic substances.

Still a further object is the provision of foods and food ingredients and products preserved against injurious oxidation and rancidity by the method and materials referred to above.

Naturally occurring fats and oils are somewhat protected from rancidity by the presence of accompanying natural antioxidants which are found in the fats and oils. During the process of purifying and refining naturally occurring fats and oils, and during the manufacture of food products containing them, some of these natural antioxidants are removed, and/or the fats and oils are made more susceptible to oxidation by atmospheric oxygen. because of the chemical and/or heat treatment which they have undergone, so that during subsequent storage and marketing such edible fats and oils or foods and food products containing them often become rancid and unfit for human consumption. Similarly active biological products on storage tend to become inactive through oxidation changes.

The present invention is based on the discovery that these undesirable changes can be effectively prevented from taking place during prolonged periods of exposure to oxidizing conditions by adding to the fats and oils, or to the foods and food ingredients and products containing them, or to biological products, a small amount of certain efficient antioxidant substances, termed inhibitols, obtained from, or of the general character occurring in edible vegetable material, and therefore capable of use without harmful adulteration or any other injurious effect. These inhibitols appear to be of a rather complex nature and as yet have not been completely identified. Those so far investigated appear to be definite chemical compounds containing varying proportions of carbon, hydrogen and oxygen and to have at least one hydroxyl group. They may be subjected to vacuum distillation and in this way many may be recovered in the fractions distilling at from 0.05 to 0.2 mm. pressure within various portions of the range 90–220° C. depending upon the source from which they are derived and apparently also upon their chemical composition. In some cases the inhibitol is obtained mixed with a small quantity of a vitamin from which it is unnecessary to separate it for ordinary uses. The methods used in obtaining the inhibitols insure, as will be demonstrated in outlining the methods applicable to the treatment of representative vegetable materials for obtaining their antioxidant content, that the inhibitols are not to be classified as sterols or as pigments or as any other commonly recognized components of the unsaponifiable lipids of plants, but as a new group of substances which are distinguished by their ability to retard the onset of rancidity in fats.

The inhibitols coming within the present invention are preferably obtained from sound and unspoiled inhibitol containing vegetable materials such, for example, as lettuce, alfalfa, spinach, carrots, green tea, tomatoes and vegetable oils, such as cottonseed oil, wheat germ oil, corn oil, soya bean oil, palm oil and sesame oil. The oils may or may not be partially hydrogenated.

In general, the antioxidant portion of plants or plant fats may be obtained in the following manner: If plant tissue is to be used, the fats or lipid substances must first be extracted. This may be done with the use of suitable solvents, usually alcohol. The fatty material obtained from the alcohol, or the fat which is to be used, is subjected to a saponification treatment and extracted with a suitable solvent to separate the unsaponifiable lipid portion of the fatty material or fats from the products of the saponification treatment. A known method which may be employed for effecting this separation consists in saponifying the fatty material, or the fat which is to be used, with alcoholic alkali. The saponified mixture is then diluted and extracted thoroughly with ether. The ether is washed free of soaps, dried with anhydrous sodium sulphate and evaporated. The residue which remains is the unsaponifiable lipid fraction. This fraction contains sterols, pigments, particularly carotenoid pigments, saturated hydrocarbons, solid straight chain alcohols and many unidentified compounds, as well as those responsible for the antioxygenic activity. Obtained from some sources, even these crude unsaponifiable lipid fractions possess antioxygenic action which is increased with the progressive removal of inactive materials by processes which will be outlined under each special case. The nature of the inactive materials and the properties of the strongest antioxident concentrates demonstrate that the inhibitols do not fall under the classification of either sterols or pigments, that they are not hydrocarbons, and that they are probably not to be classed with the solid straight chain alcohols which have been identified in such plant concentrates. The subsequent treatment of the unsaponifiable lipid fraction to effect a removal of the inactive components varies for the different sources. In general, inactive materials are removed by fractional crystallizations from solvents, by separation between two immiscible solvents, and by fractional distillation in high vacuum. As indicated above and as will be brought out more clearly in the more detailed description which follows, the procedure that should be followed in producing the purified inhibitol or a concentrate of this substance will include broadly appropriate steps for removing pigments, sterols, and higher molecular weight alcohols.

For example, the inhibitol occurring in lettuce leaves may be obtained in the following manner: The green leaves are dried in vacuo, and extracted with alcohol. The alcoholic extract is saponified and then extracted with ether. The unsaponifiable lipids of lettuce which remain when the ether has been evaporated are crystallized from acetone. The material which is insoluble consists of solid hydrocarbons and alcohols which are inactive as antioxidants, while that which remains in solution shows antioxygenic activity. The acetone is evaporated and the residue is dissolved in light petroleum ether from which an unidentified inactive precipitate settles. This is separated as before, the light petroleum ether is evaporated from the soluble material and the residue is shaken with methanol. A heavy oil containing most of the carotenoid pigments of the lettuce leaf does not dissolve. It shows no tendency to prolong the induction period of oxidizable fats when associated with them and exposed to oxidizing conditions and therefore may be regarded as inactive as an antioxidant. The methanol containing the soluble part is poured off from this oil and cooled, whereupon most of the sterols present in the unsaponifiable lipids separate. They are inactive as antioxidants. The methyl alcohol solution is then diluted with water until the methyl alcohol is 92% of the total volume and this solution is shaken several times with light petroleum ether. This process separates the compounds remaining into those soluble in light petroleum ether and those soluble in 92% methanol.

The light petroleum dissolves most of the material including vitamin E and only a very little of the antioxidant which is concentrated in the 92% methanol soluble fraction. The solvent is removed by evaporation from this fraction and the residue is subjected to fractional distillation in a high vacuum. The fraction which distils between 165° and 185° C. at 0.1 mm. pressure has the greatest activity. It is an oily substance which deposits crystals on standing. These crystals may be further purified by recrystallization from minimum amounts of chloroform. The compound which crystallizes has the formula $C_{13}H_{14}O_3$ and is the antioxidant. It forms colorless crystals and gives none of the usual sterol tests, so that it is to be classed neither as a pigment nor as a sterol. It is thus not to be confused with carotene, which is a red pigment occurring in the crude unsaponifiable lipids and has been removed as above shown, nor with ergosterol or phytosterol or other sterols, all of which have been removed and give characteristic color reactions, by which means they are classified.

The crystalline inhibitol derived from lettuce as above mentioned melts at 143° C. If the heating is continued, the melt turns brown at 225–230° C., and is completely charred at 300° C. The inhibitol is only slightly soluble in water and petroleum ether, moderately soluble in chloroform and benzene, and soluble in ether, acetone, and dilute alkalies. The solution in alkalies is yellow; concentrated solutions are reddish yellow. Alcohol solutions are optically inactive.

From acetone, the crystals are prisms terminated by pyramids, and are monoclinic. The optical properties are somewhat unusual, and may be used for identification. The negative biaxial crystals have a very high birefringence and index of refraction. The extinction angle, C to cleavage, is 30° C., and 2 V is approximately 70° C. There is extreme horizontal dispersion.

The inhibitol is very easily oxidized. Alkaline potassium permanganate, concentrated nitric acid, and ammoniacal silver nitrate are reduced instantly and in the cold.

An acetyl derivative was prepared by heating 7 mg. of the inhibitol with 1 cc. of acetic anhydride (purified by distillation) for 4 hours on a steam bath. The excess acetic anhydride was evaporated in a stream of $CO_2$ and the residue dissolved in a few drops of petroleum ether. The white crystals which developed on standing were filtered, and on heating melted at 72° C.

A concentrate containing the inhibitol of tomatoes may be obtained in the following manner: The tomatoes are completely dried in a vacuum. The dried pulp is then extracted with 90% methanol. The extracted material is freed of solvent by distillation in vacuo, then saponified, and extracted with ether in a manner similar to that used for lettuce. The unsaponifiable lipids recovered from the ether after the manner previously described are dissolved in light petroleum ether, from which solvent the sterols crystallize and can be filtered off. They are inactive as antioxidants. The filtrate is evaporated and the residue dissolved in methanol. Lycopin and carotene crystallize from the solution and may be removed. These substances are pro-oxidants, that is, they accelerate the onset of rancidity in fats. The material which remains in solution in the methanol is then separated between 92% methanol and light petroleum ether as with the lettuce concentrates, and the inhibitol is found to be preferentially soluble in the 92% methanol layer. After removal of solvents, the residue is distilled and the fraction which distils at 90° to 115° C. at 0.1 mm. pressure is found to be most active. The inhibitol of tomatoes is thus found to be similar to the inhibitol of lettuce in its solubility properties but to differ in its distillation range. The distillate is practically colorless.

In the preparation of the inhibitols from the vegetable oils, as in the treatment of vegetable substances previously described, the first step comprises concentrating the unsaponifiable portion of the oil. A convenient method of saponifying large or small amounts of oil or fat in a minimum time and with a minimum opportunity for oxidation is shown in the following example: 26 grams of potassium hydroxide is dissolved in 22 cc. of water which is heated and poured into 89 cc. of 95% ethyl alcohol. This mixture is poured directly into a flask containing 100 grams of the oil or fat. The mixture is agitated vigorously until it becomes homogeneous. The soaps are allowed to cool to 40°-50° C. and poured into 450 cc. of water. To this is added 450 cc. of ethyl ether and the mixture is shaken. The ether layer separates immediately. The water-alcohol solution of the soaps may be repeatedly extracted with ether without emulsification.

The inhibitol of wheat germ oil and the inhibitol from cottonseed oil may be obtained as a concentrate in the following manner: The oil is saponified and extracted according to a known method of obtaining the unsaponifiable lipid fraction, such for example as that hereinbefore described. The ether extracts are evaporated to dryness and the unsaponifiable lipids are dissolved in light petroleum ether and the solution allowed to stand in a refrigerator. The sterols of wheat germs crystallize and can be filtered off. They are inactive as antioxidants. The light petroleum ether is evaporated from the soluble portion and the residue is extracted several times with hot methanol. Only a small part of the fraction is soluble but the soluble material includes the inhibitol. If the methanol solvent is then removed by evaporation and the residue distilled in a high vacuum, the fraction which distils from 190° to 210° C. at 0.1 mm. pressure will be found to be most active. This fraction is a light yellow oil.

The inhibitol obtained from cottonseed oil is to be distinguished from gossypol as well as the other materials previously mentioned. Gossypol has been described in the prior art as having antioxidant properties with respect to cottonseed oil. It is clear that the inhibitol is different from gossypol when it is considered that upon saponification of the oil, the gossypol is in the water phase, whereas the inhibitol is obtained in the ether extracts.

In the case of the inhibitols prepared from the vegetable oils, particularly cottonseed and wheat germ oil, the final concentrate usually contains vitamin E mixed with the inhibitol. The separation of these two materials is difficult and in most instances where the inhibitols are employed, no useful purpose is accomplished by attempting the separation.

The inhibitol present in palm oil may be prepared in concentrated form in the following manner: The oil is saponified and extracted with ether in the same manner as hereinbefore described. The unsaponifiable lipids are dissolved in light petroleum ether and filtered from an inactive, unidentified precipitate. The light petroleum ether is evaporated and the residue is dissolved in acetone and cooled. A mixture of sterols and carotene crystallizes and may be filtered off. The mixture is a pro-oxidant, while the soluble material is strongly antioxygenic. The acetone is evaporated and the residue is shaken with methanol which dissolves only a portion of the oily material. The soluble portion contains the inhibitol while the insoluble portion is inactive. If the methanol is evaporated and the residue distilled in a vacuum (0.05 mm. pressure), the antioxidant will be concentrated in the fraction which distils between 190° and 210° C. This fraction is dissolved in methanol and cooled; small amounts of a sterol crystallize. The sterol is inactive while the soluble portion is strongly antioxygenic. The oil which remains after evaporation of the methanol is pale yellow in color.

In another method of preparing the inhibitol concentrate from palm oil the unsaponified fraction of the oil is dissolved in petroleum ether and diluted with an equal volume of methanol. Any carotene which crystallizes is separated by filtration and the petroleum ether is evaporated. An insoluble oil separates and the methanol extract is decanted therefrom. The oil is washed with methanol and the combined extracts are hydrogenated in order to destroy any remaining pro-oxygenic carotenoids. The extract is evaporated to dryness and the residue extracted in petroleum ether. On the evaporation of the ether extract a limpid oil remains which is fractionated in a high vacuum (.03 to .04 mm.). The inhibitol obtained is most highly concentrated in the fraction distilling within the range of 165-180° C.

Methods other than treatment with caustic may be employed for concentrating the unsaponifiable portion of the oil. When the source of material from which the inhibitol is to be prepared is one of the vegetable oils, such as cottonseed oil, the unsaponifiable portion may be concentrated by extraction with suitable solvents. As an example of such a process, partially hydrogenated cottonseed oil is vigorously agitated with hot methyl or ethyl alcohol and the mixture then chilled in a freezing atmosphere. The alcohol which forms on top of the solidified fat contains a greater proportion of the inhibitol than does the solidified fat. In this process the alcohol functions to preferentially remove unsaponifiable material and the alcohol may be evaporated and the residue treated in accordance with the processes previously described.

Any alcohol in the remaining fat may be removed and in most instances it is still suitable for its originally intended purpose. Other methods known in the prior art, for separating saponifiable and unsaponifiable portions of fatty materials may be employed if desired.

While the inhibitols are obtained by slightly different methods, depending upon the source of the substance, and may also vary in their distillation ranges, and possibly in the complexity of their chemical composition, they are nevertheless all similar in possessing a free hydroxyl group and antioxygenic properties. When the inhibitol is treated with a material which reacts with the hydroxyl group, for example, as in the processes of esterification and alkylation, the antioxygenic property of the substance disappears. For example, if the inhibitol is esterified with acetyl chloride or acetic anhydride, the antioxygenic capacity is destroyed. From such an ester, however, the inhibitol can be regenerated by an alkaline hydrolysis which results in a restoration of the free hydroxyl group.

The antioxygenic activity of the active and inactive fractions of the materials which have been described above has been measured by the oxygen absorption method which follows. If a mixture of autoxidizable fats is exposed to oxygen at a given temperature, a definite interval of time elapses before there is an appreciably rapid absorption of oxygen. This time has been called the induction period. The antioxygenic action of any fraction is expressed in terms of its ability to prolong the induction period when a small amount of it is added to the autoxidizable fat mixture. For example, a properly treated mixture of lard and cod liver oil has an induction period of six hours in oxygen at 70° C. If one mg. of the inhibitol of lettuce is dissolved in 5 grams of this fat mixture, the fat will not begin to absorb oxygen under the same conditions until after it has been exposed for 180 hours. In our experience the results by this method closely parallel those obtained by other methods for determining the stability of fats but is more accurate. Every fraction which has been mentioned in the above description has been assayed many times by this method.

When inhibitols, such as described above, are added in small amounts, say for example, 0.02% by weight, to foods and food products whose fats and/or oils tend to become rancid on storage, such foods and food products are maintained in an edible condition for periods many times longer than without such addition, the extent of this period depending upon the amount of antioxidant added.

The inhibitols in addition to being effective by themselves in retarding the oxidation of food substances may also be employed along with various other substances exerting an antioxidant effect on many materials, for example, maleic acid, citric acid, phosphoric acid and their acid salts, and lecithin. The acid antioxidant substances and the inhibitols demonstrate a synergistic effect when used together; for example, a fatty ester treated with .02% tartaric acid and .1% of the inhibitol will have its induction period increased about thirty-three times that of the untreated material, whereas the material containing .1% of an inhibitol of wheat germ oil will have its induction period increased about four times and the material treated with .02% tartaric acid will have its induction period increased about three times.

It will be understood that various changes and modifications in the methods of obtaining and employing the antioxidant substances may be made without departing from the spirit of the invention as defined in the appended claims.

This is in part a continuation of our applications Serial No. 674,696, filed June 7, 1933, and Serial No. 544,920, filed June 16, 1931.

We claim:

1. The process of obtaining an antioxidant concentrate having at least one hydroxyl group from a lipid and antioxidant containing vegetable substance which comprises extracting the fatty constituents of said substance, separating the antioxidant and lipid containing portion of said fatty constituents, and subjecting said portion to a fractionation treatment to separate said antioxidant from the pigments and sterols contained in said portion.

2. The process of obtaining an inhibitol having at least one hydroxyl group from a lipid and antioxidant containing vegetable substance which comprises extracting the fatty constituents of said substance, separating the saponifiable and unsaponifiable portions of said fatty constituents by saponification and extraction, subjecting the unsaponifiable portion to a series of fractionation treatments to remove successively any carotenoid pigments and sterols contained in said unsaponifiable portion, and finally recovering the inhibitol from the residue by fractional distillation, the inhibitol being separated as the fraction distilling within the range 90–220° C. at from 0.05 to 0.2 mm. pressure.

3. The process of obtaining an antioxidant concentrate having at least one hydroxyl group from the unsaponifiable portion of the fatty constituents of an edible lipid and antioxidant containing vegetable substance which comprises subjecting said unsaponifiable portion to a fractionation treatment to separate said antioxidant from pigments and sterols contained in said portion.

4. The process of obtaining an inhibitol having at least one hydroxyl group from the unsaponifiable portion of the fatty constituents of cottonseed oil which comprises subjecting said unsaponifiable portion to a fractionation treatment to separate said inhibitol from pigments and sterols contained in said portion, and finally recovering the inhibitol from the residual fraction by fractional distillation, the inhibitol being separated as the fraction distilling between 190° and 210° C. at 0.1 mm. pressure.

5. The process of obtaining an inhibitol having the probable formula $C_{13}H_{14}O_5$ and containing at least one phenolic hydroxyl group from lettuce which comprises extracting the fatty constituents of said material, separating the saponifiable and unsaponifiable portions of said fatty constituents by saponification and extraction; subjecting the unsaponifiable portion to a fractionation treatment to separate said inhibitol from the pigments and sterols contained in said unsaponifiable portion, and finally recovering the residual fraction by fractional distillation, the inhibitol being separated as the fraction distilling between 165° and 185° C. at 0.1 mm. pressure.

6. An edible antioxygenic concentrate consisting principally of a chemical substance consisting of the elements carbon, hydrogen and oxygen, and containing at least one hydroxyl group, said substance being soluble in ether, acetone, methyl alcohol and chloroform, and said concentrate being substantially free from sterols and pigments and distilling within the range 90–220° C. at from 0.05 to 0.2 mm. pressure, and being obtainable by subjecting the unsaponifiable portion of the fatty constituents of a lipid and antioxidant containing vegetable substance, to a fractionation treatment to separate said concentrate from sterols and pigments.

7. As a new composition of matter, the product consisting principally of an inhibitol having the probable formula $C_{13}H_{14}O_5$, and containing at least one phenolic hydroxyl group soluble in ether, acetone, methyl alcohol and chloroform, substantially free from sterols and pigments, and distilling at a temperature of from 165–185° C. at about 0.1 to 0.2 mm. pressure and obtainable by subjecting the unsaponifiable portion of the fatty constituents of lettuce to a fractionation treatment to separate said product from sterols and pigments.

8. As a new composition of matter, the product consisting principally of a chemical substance consisting of the elements carbon, hydrogen and oxygen, and containing at least one hydroxyl group possessing antioxygenic properties and soluble in ether and methyl alcohol, said product being substantially free from sterols and pigments and distilling at a temperature of from 165 to 220° C. at around .05 to .2 mm. pressure and obtainable by subjecting the unsaponifiable portion of the fatty constituents of a lipid and antioxidant containing vegetable oil to a fractionation treatment to separate said product from sterols and pigments.

9. As a new composition of matter, the product consisting principally of a chemical substance consisting of the elements carbon, hydrogen and oxygen, and containing at least one hydroxyl group possessing antioxygenic properties and soluble in ether, methyl alcohol and acetone, said product being substantially free from sterols and pigments and distilling at a temperature of from 165–210° C. at about .03 to .05 mm. pressure, and obtainable by subjecting the unsaponifiable portion of the fatty constituents of palm oil to a fractionation treatment to separate said product from sterols and pigments.

10. As a new composition of matter, the product consisting principally of a chemical substance consisting of the elements carbon, hydrogen and oxygen, and containing at least one hydroxyl group possessing antioxygenic properties and soluble in ether and methyl alcohol, said product being substantially free from sterols and pigments and distilling at a temperature of from 190° to 210° C. at around 0.1 mm. pressure and obtainable by subjecting the unsaponifiable portion of the fatty constituents of cottonseed oil to a fractionation treatment to separate said product from sterols and pigments.

11. The method of retarding oxidation and rancidity of food materials which comprises adding thereto a small amount of a substance having antioxygenic properties, said substance being a chemical compound consisting of carbon, hydrogen and oxygen, and containing at least one hydroxyl group, and being soluble in ether, acetone, methyl alcohol and chloroform, and being substantially free from association with sterols and pigments, and which is obtainable by subjecting the unsaponifiable portion of the fatty constituents of a lipid and antioxidant containing vegetable substance, to a fractionation treatment to separate said substance from pigments and sterols contained in said portion, and finally recovering said substance from the residual fraction by fractional distillation.

12. The method of retarding oxidation and rancidity of food materials which comprises adding thereto a small amount of a substance having antioxygenic properties, said substance including a chemical compound consisting of carbon, hydrogen and oxygen, and containing at least one hydroxyl group, and being soluble in ether, acetone, methyl alcohol and chloroform, and being substantially free from association with sterols and pigments, and which is obtainable by subjecting the lipid antioxidant portion of the fatty constituents of cottonseed oil to a separation and fractionation treatment to separate said substance from pigments and sterols contained in said portion.

13. The method of retarding oxidation and rancidity of food materials which comprises adding thereto approximately 0.02% by weight, of an inhibitol having the probable formula $C_{13}H_{14}O_5$, containing at least one phenolic hydroxyl group, and distilling within the range 165–185° C. at 0.1 mm. pressure, and which is soluble in ether, acetone, methyl alcohol and chloroform, substantially free from sterols and pigments and is obtainable by subjecting the unsaponifiable portion of the fatty constituents of lettuce to a fractionation treatment to separate such substance from sterols and pigments.

HENRY A. MATTILL.
HAROLD S. OLCOTT.